(No Model.)
J. W. HYATT
FILTERING AGENT.
No. 283,489. Patented Aug. 21, 1883.
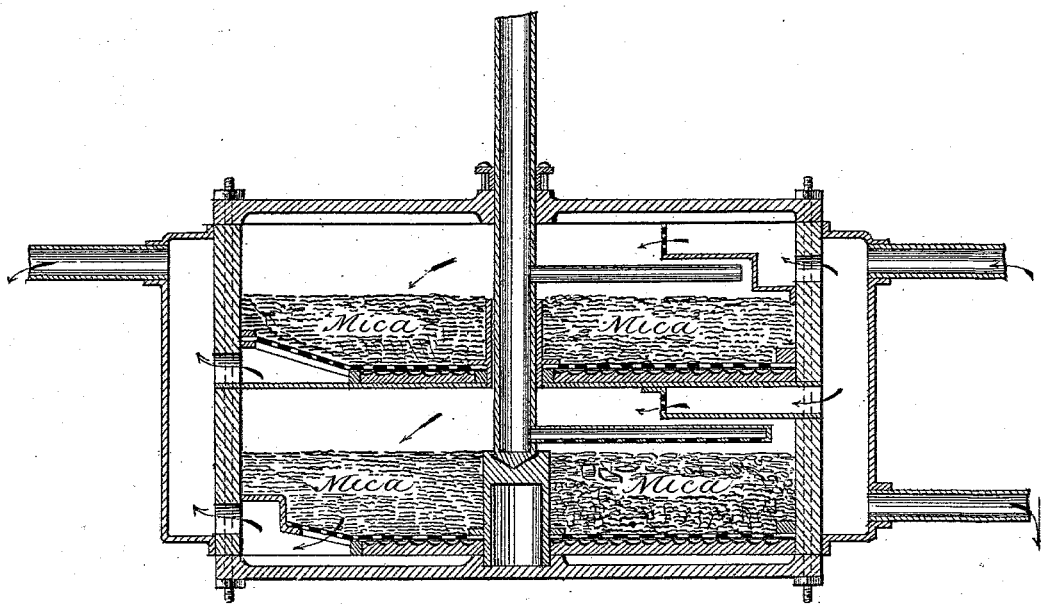
Witnesses;
Walter Fowler
H. B. Applewhaite,
Inventor;
John W. Hyatt
by his Atty's
Cox and Cox

UNITED STATES PATENT OFFICE.

JOHN W. HYATT, OF NEWARK, NEW JERSEY.

FILTERING AGENT.

SPECIFICATION forming part of Letters Patent No. 283,419, dated August 21, 1883.

Application filed June 7, 1882. Renewed January 27, 1883. (No model.)

*To all whom it may concern:*

Be it known that I, JOHN W. HYATT, of Newark, in the county of Essex and State of New Jersey, have invented a new and useful Improvement in Filtering Agents, of which the following is a specification.

The invention has relation to improvements in filtering agents; and it consists, essentially, in the discovery that comminuted material in the form of flakes may be used with especially satisfactory results, substantially as granular material has been heretofore used.

The drawing accompanying this specification shows a vertical central section of a filter with my improved filtering material applied.

In practicing my invention I take any material of such a character that when comminuted it will assume the form of flakes, which is utilized in the formation of a filter-bed, the same as granular material—such as sand, for example—is now used.

I have found that mica may be used with especially satisfactory results, and recommend its employment in preference to other materials, although I do not limit my claim to any particular material. In using the material it will be employed substantially as other known filtering agents of an analogous character have been used, according to methods that are well understood by persons skilled in the art to which the invention relates.

I prefer to employ, and recommend the use of, material of the size, configuration, and general characteristics of mica in flakes—say about from one-fourth to one-half of an inch (more or less) in diameter, as nearly as may be accomplished by grinding the material in the customary way.

What I claim as my invention, and desire to secure by Letters Patent, is—

1. A filter-bed consisting, essentially, of comminuted material in the form of flakes, substantially as set forth.

2. A filter-bed consisting, essentially, of comminuted mica, substantially as set forth.

In testimony that I claim the foregoing improvement in filtering agents, as above described, I have hereunto set my hand this 18th day of May, 1882.

JOHN W. HYATT.

Witnesses:
HERMAN GUSTOW,
ROWLAND COX.